April 7, 1959
L. S. BENSKY ET AL
2,880,934
REVERSIBLE COUNTING SYSTEM
Filed March 1, 1954
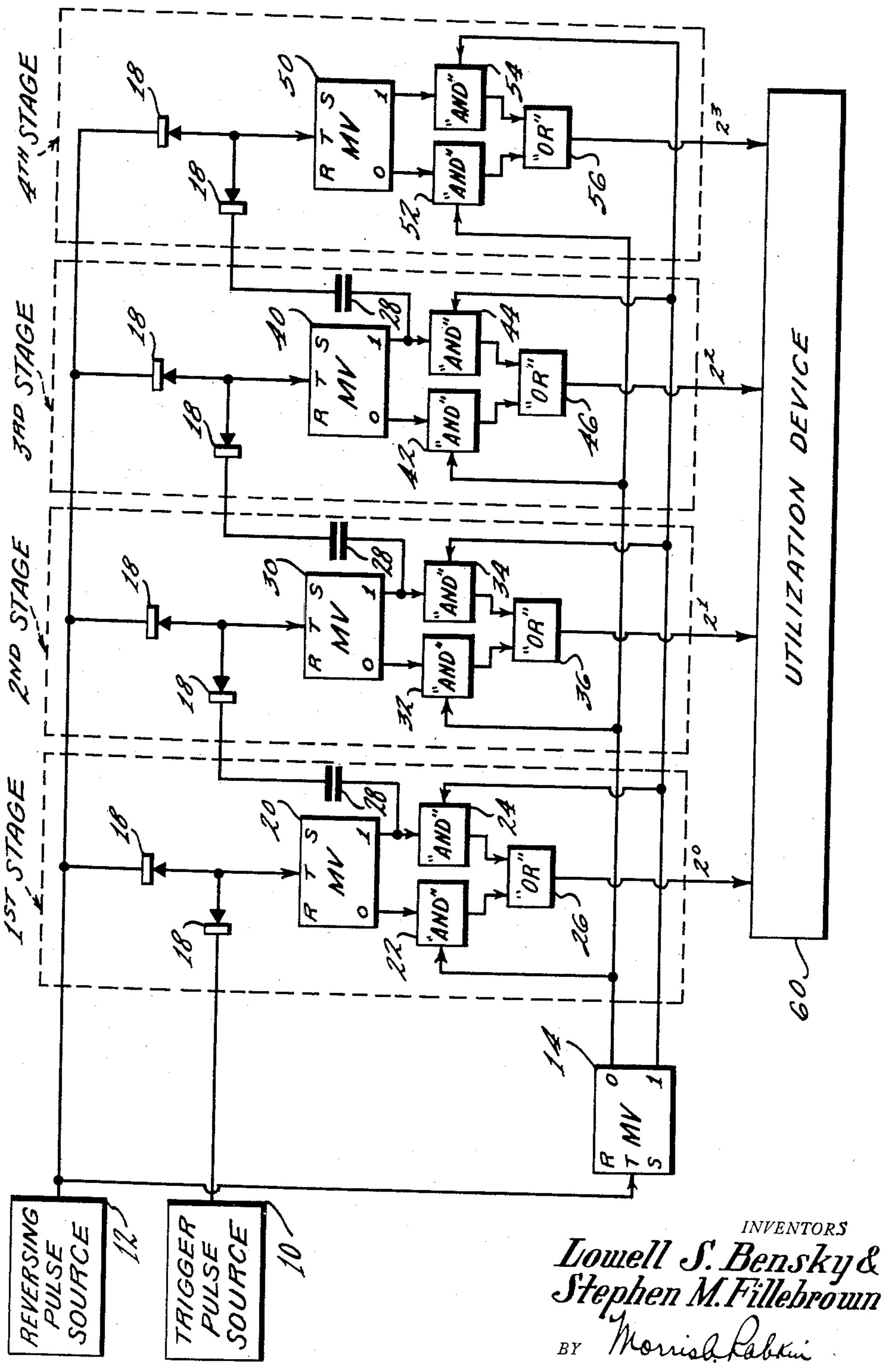
INVENTORS
Lowell S. Bensky & Stephen M. Fillebrown
BY Morris A. Rabkin
ATTORNEY 2,880,934

REVERSIBLE COUNTING SYSTEM

Lowell S. Bensky, Levittown, Pa., and Stephen M. Fillebrown, Collingswood, N.J., assignors to Radio Corporation of America, a corporation of Delaware Application March 1, 1954, Serial No. 413,238

14 Claims. (Cl. 235—92)

This invention relates to counting systems, and more particularly to counting systems which count reversibly.

In modern computing systems there often is a need for a device which will count to and from variable quantities, and which will also provide a representation of the count at any instant. Thus, in storing information, it may be desired to count the items in a message and to provide separate addresses for the items as the message is read into a temporary store, and then to re-count precisely the same number in a reverse sequence in order to read out the message.

Various systems, generally called reversible counters, are known which accomplish the functions of counting and recounting. These reversible counter systems often employ a cascaded binary counter for the counting function involved and special gating arrangements between the stages for causing reversal of the direction of count.

The systems of the prior art, however, are often complex, and also, partly because of the complexity, not as reliable as may be desired. These reversible counter systems often require considerable equipment between the stages of the cascade or special counter circuits to insure that the operation in the reverse direction is similar to that in the forward direction. Further, these systems do not often provide the feature of counting to and from variable quantities.

Therefore, an object of this invention is to provide a reversible counting system which is characterized by greater simplicity and economy than the reversible counters previously known.

Another object of this invention is to provide an improved reversible counting system which can count to and from variable quantities while providing a binary representation of the count at all times.

A further object of this invention is to provide an improved reversible counter having reliable and simple operation.

Another object of this invention is to provide an improved reversible counter whose internal mode of operation is the same whether counting forward or backward.

According to the invention, a binary counter is converted to a reversible counter by the addition of gating arrangements to the outputs of the individual stages. When counting in a forward direction outputs are taken from the "1" side of each binary stage in conventional fashion. When the direction of the count is to be reversed, the binary condition of each stage is reversed, which places the complement of each digit in the counter. The outputs are then taken from the "0" side of each stage. Thus, for example, when the count is nine, the binary counter reaches 1001 and is reversed to 0110 (when the "1" side is the output). Although inputs are applied in the same manner, further counts are taken from the "0" side of each stage. It can be shown that on reaching a 0000 output, nine units have been counted in the reverse direction, and that the binary outputs of the system have occurred in a sequence which is the reverse of that in the forward count.

The novel features of the invention, as well as the invention itself, both as to its organization and method of operation, may best be understood from the following description, when read in connection with the accompanying drawing, which represents a schematic view of an arrangement for practicing the invention.

Referring to the drawing, a trigger pulse source 10 is coupled through a rectifying element 18 to the trigger input of a first bistable multivibrator 20. The rectifying elements 18 herein employed are used as buffering diodes to prevent movement of pulses and signals in undesired directions. The rectifying elements 18 have accordingly all been designated by the same numeral. The first bistable multivibrator 20, and the subsequent bistable multivibrators herein employed, may be of any suitable type, several being well known in the art as, for example, an Eccles-Jordan flip-flop. An Eccles-Jordan flip-flop has two output terminals, here designated as the reset and set terminals, and simultaneously produces on these terminals individual steady state potentials of high and low amplitude. By steady state is meant a quiescent condition unaffected by the passage of time alone. The instantaneous relationship of high and low steady state outputs on the terminals of the flip-flop may be reversed by the application of a proper input signal, so that the flip-flop may be said to have two stable states of operation. This alternative operation enables the flip-flop to represent numbers in the binary system. The specific example chosen here, for illustrative purposes only, is that in which a high level output on a reset terminal has a binary zero significance, and in which a high level output on a set terminal has a binary one significance. The flip-flop may be turned over, or switched, from one stable state to the other by the application of input pulses of proper polarity. Here negative pulses are applied to a trigger input terminal, T, which is internally connected within the flip-flop to the set and reset inputs (denoted S and R, respectively, in correspondence to the associated output terminal) to provide the desired reversal of states.

A reversing pulse source 12 is coupled through individual rectifying elements 18 to the trigger inputs of cascaded bistable multivibrators, for example, four in number, here successively called the first, second, third, and fourth bistable multivibrators 20, 30, 40, and 50, respectively. The reversing pulse source 12 is also coupled to the trigger input terminal T of a bistable control multivibrator 14, which may be of the same type and is designated in the same fashion as the above mentioned multivibrators. Alternatively, individual couplings from the reversing pulse source 12 could be made to the set and reset inputs of the bistable control multivibrator 14.

Each bistable multivibrator 20, 30, 40 or 50 forms a part of a different digital channel, or binary stage, in the binary counter. The stages are indicated in the drawing by blocks consisting of dotted lines, and are denoted as stages one to four, respectively. The use of four digital channels, or binary stages, is for illustrative purposes only. A different number of channels may be employed if desired. Cascading between the stages is accomplished by coupling the set output of each bistable multivibrator 20, 30, 40, or 50 through a coupling capacitor 28 and a rectifying element 18 to the trigger input terminal T of the succeeding stage.

A similar output gating arrangement is employed in each of the stages. The arrangement in the first stage is typical and it alone will be described in detail. The description of the first stage may be applied to the subsequent stages, although the units therein employed are designated in a manner appropriate to the higher numbered stages. The reset or binary zero output 0 of the first bistable multivibrator 20 is coupled to one input of a two input "and" gate, here designated as a first reset "and" gate 22. An "and" gate, or coincidence gate, is well known in the art and provides an output signal on the coincidence of signals of proper polarity on all its inputs. The other input of the first reset "and" gate 22 is coupled to the reset output 0 of the bistable control multivibrator 14. A first set "and" gate 24 having two inputs has one input coupled to the set (or binary one) output 1 of the first bistable multivibrator 20 and the other input coupled to the set output 1 of the bistable control multivibrator 14. The outputs of the first reset "and" gate 22 and the first set "and" gate 24 are coupled to two inputs of a first "or" gate 26. An "or," or mixer, gate is likewise well known to those skilled in the art, and provides an output signal on the application of an input signal of proper polarity to any one of its inputs. The output of the first "or" gate 26 represents the output of the first stage, which, in the binary system, is the value of the zero power of two. An "or" gate output is here taken to represent a binary one, and the absence of an output is here taken to represent a binary zero.

As stated previously, the gating arrangements in the succeeding stages are similar to that of the first stage, except that they bear the designations of the particular stage in which they reside. Thus, the "or" gates are termed, successively, the second stage "or" gate 36, the third stage "or" gate 46, and the fourth stage "or" gate 56. Similarly, other gates in the successive stages are termed the second stage reset "and" gate 32, the third stage reset "and" gate 42, etc. The outputs of the "or" gates of the channel are identified successively by their binary significance as $2^1$, $2^2$, and $2^3$ power outputs. It is to be noted, however, that in binary, as in decimal notation, the least significant digit is written on the right, e.g., the binary value of a decimal one is 0001.

The outputs of the individual stages are here shown coupled to the inputs of a system which is broadly termed a utilization device 60. Such a device may be, for example, an addressing matrix for a memory system having a plurality of discrete memory positions. Numbers of varying lengths would then be read in, most significant digit first, to successive addresses in the memory. Read out of the addressed information would be with least significant digit first, which is an order which may be advantageously used for addition or multiplication. Or, as another example, the utilization device 60 might be a computing system which employs a count-down process for subtraction of one number from another. Computing systems using this technique are well known to those skilled in the art.

In operation, the source of trigger pulses 10 provides a series of pulses to be counted. The reversing pulse source 12 provides a pulse which indicates that counting in the forward direction has ceased and that the direction of count is to be reversed. It is to be noted that the reversing pulse source 12 reverses the operation of the system as a whole, but not the operation of the binary counter portion of the system. The trigger pulse source 10 then again provides a series of pulses which are to be counted until the desired count is reached. As a specific and simple illustration, it will be assumed that all zeros on the outputs are the desired starting and ending conditions. When commencing, then, the bistable control multivibrator 14 provides a high level output on the set, or binary one terminal 1. This output at terminal 1 of multivibrator 14 activates one input of each of the set "and" gates 24, 34, 44, and 54. Thus the control multivibrator 14 output may be said to "prime" the set "and" gates 24, 34, 44, and 54 for production of individual output signals when signals are applied to their remaining inputs.

In the starting condition, assume all bistable multivibrators 20, 30, 40, and 50 provide high level outputs at the reset, or binary zero terminal 0. Trigger pulses from the trigger pulse source 10 switch these steady states in cascade fashion from one individual multivibrator to the next. For example, on the application of a first trigger pulse to the first bistable multivibrator 20, that multivibrator turns over and provides a high level output on the binary one side. A second pulse from the trigger pulse source 10 applied to the first bistable multivibrator 20 then turns back the bistable multivibrator 20 to the binary zero condition. The return to the low level output on the binary one side of the first bistable multivibrator 20 triggers the second bistable multivibrator so that the second bistable multivibrator 30 switches to the binary one condition. The forward counting process continues in this binary fashion.

As stated previously, when counting forward from a starting condition the set "and" gates 24, 34, 44, and 54 are primed by the bistable control multivibrator 14. Wherever a bistable multivibrator 20, 30, 40, or 50 provides a high level output on the set or binary one side, therefore, the set "and" gate 24, 34, 44, or 54 likewise provides an output, and this output is directed through the coupled "or" gates 26, 36, 46, or 56. An output on an "or" gate is here taken as a binary one and the absence of an output as a binary zero. For example, when the counter has reached the decimal number nine, the output pattern on the "or" gates 26, 36, 46 and 56 represents the decimal number nine in binary fashion. Those outputs are 1001, so that, in this example, the only "or" gates conducting are gates 26 and 56.

The manner of reversal of the counting operation of the system, and the manner in which zero is again reached, will be described with reference to the binary number 1001 (decimal nine). On the completion of the desired forward count, a negative pulse is provided from the reversing pulse source 12. The negative pulse may be initiated as a result of computer programming or of other well known computer techniques. The reversing pulse turns over all the bistable multivibrators 20, 30, 40, and 50 and also the bistable control multivibrator 14. The reversing pulse is of sufficiently long duration to block out carry over pulses between the stages caused by switching of the individual flip-flops. Thus, high level outputs are provided corresponding to the binary number 0110, and the bistable control multivibrator 14 provides a high level output on the reset or binary zero side. Consequently, all the reset "and" gates 22, 32, 42, and 52 are primed, and the first and fourth reset "and" gates 22 and 52 provide an output. Subsequent trigger pulses from the trigger pulse source 10 result in a binary counting action in a reverse direction. The process after reaching binary 1001 may be summarized in the following fashion:

(Note that an "or" gate output represents a binary one value, and that the absence of an output represents a binary zero value.)

Count to 9: 1001
Reverse each stage: 0110

| Added Pulses | Output if set "and" gates were primed as in counting forward | Output with reset "and" gates primed after reversing pulse | Decimal equivalent of binary output |
|---|---|---|---|
| 0 | 0110 | 1001 | 9 |
| 1 | 0111 | 1000 | 8 |
| 2 | 1000 | 0111 | 7 |
| 3 | 1001 | 0110 | 6 |
| 4 | 1010 | 0101 | 5 |
| 5 | 1011 | 0100 | 4 |
| 6 | 1100 | 0011 | 3 |
| 7 | 1101 | 0010 | 2 |
| 8 | 1110 | 0001 | 1 |
| 9 | 1111 | 0000—Output | 0 |

Thus it may be seen that nine pulses after the arrival of a reversing pulse, the reversible counter is again in the starting, or zero, condition. Bearing in mind that the least significant digit is on the right hand side, it will be apparent that the counting down process is the reverse of counting forward. In other words, the same succession of binary numbers is repeated, but in reverse order, as the counter goes from the minimum to the maximum counts and then back to the minimum again. The count may, therefore, begin at and return to a given number other than zero. Or, if desired, the count may begin at one number and end at another after reversal, or begin in the count down direction and reverse to the count forward direction. Likewise, this counting process and arrangement may be employed in other applications, such as subtractive processes and comparisons for identity.

Thus, there has been described a rapid and efficient reversible counter which may be any binary counter with the addition of external gating units. A counter may be cascaded to any number of binary stages desired, and various gating elements may be employed in achieving the same result. As an example, the "and" and "or" gates may be of vacuum tube or crystal diode design, and the binary counter of vacuum tube or transistor design.

What is claimed is:

1. An impulse responsive circuit comprising a plurality of cascaded bistable multivibrators, a first of said multivibrators being responsive to said impulses, and each of said multivibrators providing two different steady state outputs, a first plurality of coincidence means, each one of said first plurality of coincidence means being responsive to a given output of a different one of said multivibrators, a second plurality of coincidence means, each one of said second plurality of coincidence means being responsive to the other output of a different one of said multivibrators, a plurality of signal responsive means respectively corresponding to said multivibrators, each of said signal responsive means providing an output responsive to either of the two coincidence means coupled to a corresponding multivibrator, means for selectively priming said first and second pluralities of coincidence means and means for individually coupling a source of reversing pulses to said priming means and each of said multivibrators, said priming means and said multivibrators being simultaneously and individually responsive to said reversing pulses.

2. The invention as set forth in claim 1, wherein said first and second pluralities of coincidence means are comprised of two input "and" gates, and wherein said means for selectively priming said first and second sets of coincidence means includes a bistable multivibrator.

3. A reversible counter comprising a plurality of cascaded binary stages, a source of pulses for indicating the reversal of the counting action, a bistable control multivibrator coupled to and responsive to said source of reversing pulses for providing alternate high level outputs in one of two output paths, each of said stages comprising a different bistable multivibrator circuit having a trigger input and a pair of outputs, each of said trigger inputs being coupled to and responsive to said source of reversing pulses, said bistable multivibrator circuits providing alternate high and low steady output signals on said outputs, the bistable multivibrator circuit of the first of said stages being responsive to a series of trigger pulses to be counted and a given output of each said multivibrator circuit being coupled to the trigger input of the multivibrator circuit of the next succeeding stage, a first two input "and" gate coupled at one input to one output of the bistable multivibrator circuit in the same stage and at the other input to one output of said bistable control multivibrator, a second two input "and" gate coupled at one input to the other output of the bistable multivibrator circuit in the same stage, and coupled at the other input to the other output of said bistable control multivibrator, and a two input "or" gate having its inputs coupled individually to the outputs of said first and second "and" gates.

4. The invention as set forth in claim 3, wherein said couplings from said given output of each bistable multivibrator circuit to the trigger input of the next succeeding bistable multivibrator circuit, each includes a coupling capacitor and a rectifier.

5. In a reversible counter having a plurality of cascaded binary stages, each of said stages having a bistable circuit having two binary conditions and each said stage having two corresponding output channels, one channel only of each stage except the last being connected to the succeeding stage, the improvement characterized by pairs of coincidence gates respectively within corresponding stages, the gates of any pair being connected respectively to the channels of the corresponding stage, each gate thereby being responsive to a different binary condition within its corresponding stage, means for priming alternately said coincidence gates of each pair, a source of pulses, means connecting each of said cascaded binary stages to said source to individually reverse each said binary condition in response to a pulse from said source, and output means respectively in the different stages each responsive to the outputs of both of said coincidence gates within the said stages and adapted to provide an output on a corresponding one of said output channels.

6. The improvements as claimed in claim 5 wherein said means for priming alternately said coincidence gates comprises a bistable multivibrator responsive to said source of reversing pulses.

7. A reversible counter comprising a plurality of cascaded binary stages, each stage including a bistable device having two states and having two output leads, one only of each of said output leads being connected to the output on one of said two leads of any one of said devices having the opposite binary significance of the output on the other of said leads of the same said device, means to take one of said outputs respectively from all of the said devices and not the other as significant of a binary number, means to take the other of said outputs respectively from all of the said devices and not said one outputs as significant of a binary number, and means to change the outputs on all of said output leads and also to change from one of said means to take outputs to the other one of said means to take outputs.

8. A reversible counter comprising a plurality of cascaded binary stages each including a multivibrator, each of said multivibrators having a trigger input and two output leads, one only of said leads being connected to the trigger input of a multivibrator in a succeeding stage, pairs of "and" gates respectively corresponding to said multivibrators, and each of said gates having two inputs, one gate of each of said pairs having one of its said inputs connected to one of said leads of its corresponding multivibrator and the other gate of each said pair having one of its said inputs connected to the other output lead of its corresponding multivibrator, all the other inputs of said one gates being connected to a first terminal for receiving a signal simultaneously and all the other inputs of said other gates being connected to a second terminal for receiving another signal simultaneously, and "or" gates respectively corresponding to said multivibrators and each connected to receive the outputs of both the said "and" gates of a corresponding stage.

9. A counter as claimed in claim 8, further comprising a bistable circuit having a trigger input and having two outputs, one of said two bistable circuit outputs being connected to said first terminal and thereby to all the ones of said "and" gates and the other of said bistable circuit outputs being connected to said second terminal and thereby to all the others of said "and" gates.

10. A reversible counter comprising a plurality of cascaded binary stages each including a multivibrator, each of said multivibrators having a trigger input and two outputs, one only of said outputs being connected to the trigger input of a multivibrator in a succeeding stage, pairs of "and" gates respectively corresponding to said multivibrators, one gate of each said pair being connected to one of said outputs of its corresponding multivibrator and the other gate of each of said pairs being connected to the other output of its corresponding multivibrator, "or" gates respectively corresponding to said multivibrators and each connected to receive the outputs of the "and" gates of a corresponding stage, a bistable circuit having a trigger input and having two outputs, one of said two bistable circuit outputs being connected to all the said ones of said "and" gates, and the other of said bistable circuit outputs being connected to all the said others of said "and" gates, and a pulse source connected to apply its output to all of said trigger input terminals.

11. A reversible counter comprising a plurality of cascaded binary stages each including a bistable device, each of said bistable devices having a trigger input and two output leads, one only of said output leads being connected to the trigger input of a bistable device in a succeeding stage, pairs of "and" gates respectively corresponding to said bistable devices, each of said gates having two inputs one said gate of each said pair having one of its said inputs connected to one of said output leads of its corresponding bistable device and the other gate of each said pair having one of its said inputs connected to the other of said output leads of its corresponding bistable device, a first terminal to which all the other inputs of the ones of said "and" gates are connected, a second terminal to which all the other inputs of the others of said "and" gates are connected, and "or" gates respectively corresponding to said bistable devices and each connected to receive the outputs of the "and" gates of a corresponding stage.

12. A counter as claimed in claim 11, further comprising a bistable circuit having a trigger input and having two outputs, one of said two bistable circuit outputs being connected through said first terminal to all the said other inputs of the ones of said "and" gates and the other of said bistable circuit outputs being connected through said second terminal to all the said other inputs of the others of said "and" gates.

13. A reversible counter comprising a plurality of cascaded binary stages each including a bistable device, each of said bistable devices having a trigger input and two outputs, one only of said outputs being connected to the trigger input of a bistable device in a succeeding stage, pairs of "and" gates respectively corresponding to said bistable devices, one said gate of each said pair being connected to one of said outputs of its corresponding bistable device and the other gate of each said pair being connected to the other output of its corresponding bistable device, "or" gates respectively corresponding to said bistable devices and each connected to receive the outputs of the "and" gates of a corresponding stage, a bistable circuit having a trigger input and having two outputs, one of said two bistable circuit outputs being connected to all the said ones of said "and" gates and the other of said bistable circuit outputs being connected to all the said others of said "and" gates, and a pulse source connected to apply its output to all of said trigger input terminals.

14. A reversible counter having a plurality of cascaded binary stages each comprising a bistable circuit with two output leads one only of which is connected to a succeeding stage and each said stage further comprising a corresponding pair of like coincidence gates, each of said gates having two inputs, both gates of each of said pairs having its said inputs connected respectively to the said output leads of the bistable circuit corresponding to that said pair whereby the two like gates of each pair respond differently to the binary conditions of the said corresponding bistable circuit to which they are connected, means connected to the other inputs of said gates for priming alternately the gates of each said pair of coincidence gates, means for coupling a source of reversing pulses to said priming means and individually to said binary stages, said priming means and said binary stages being simultaneously and individually responsive to said reversing pulses in a manner to simultaneously alternate the priming of said gates effected by said priming means and to change the binary condition of each of said binary stages, and output means respectively in the different stages, each of the output means being responsive to the outputs of both of the said coincidence gates within its respective stage.

References Cited in the file of this patent

UNITED STATES PATENTS

| | | |
|---|---|---|
| 2,594,731 | Connolly | Apr. 29, 1952 |
| 2,637,812 | Hagen | May 5, 1953 |
| 2,644,887 | Wolfe | July 7, 1953 |
| 2,665,845 | Trent | Jan. 12, 1954 |
| 2,735,005 | Steele | Feb. 14, 1956 |

FOREIGN PATENTS

| | | |
|---|---|---|
| 975,941 | France | Oct. 17, 1950 |